March 25, 1958    K. M. HOLLAND ET AL    2,828,235
GLASS FACED HONEYCOMB PANEL AND METHOD OF MAKING SAME
Filed Oct. 12, 1954
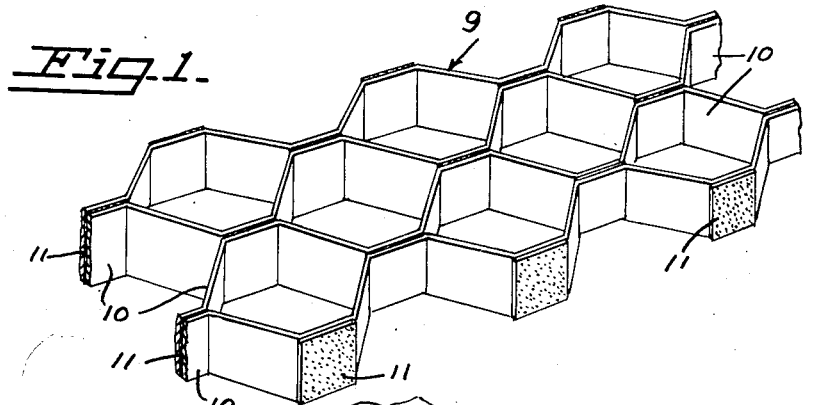
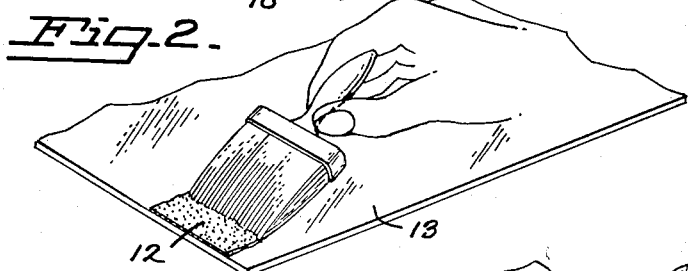
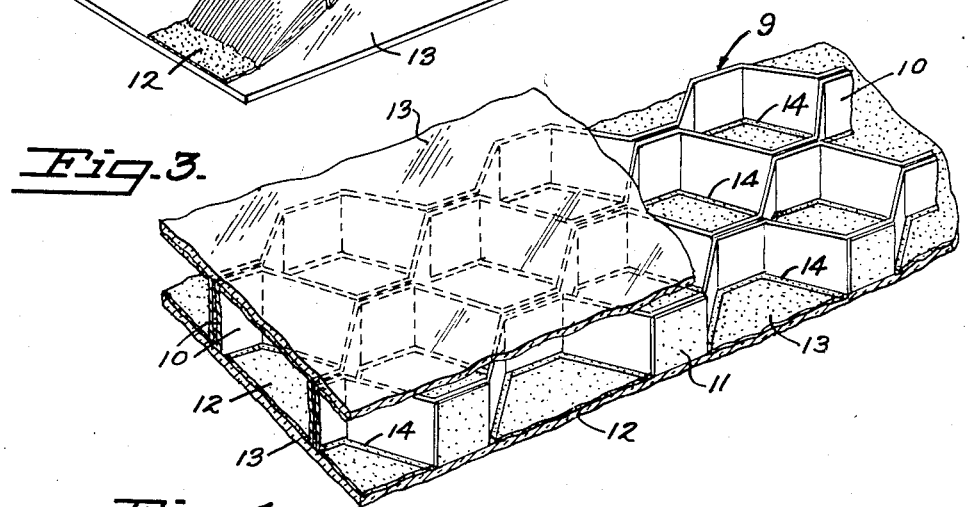
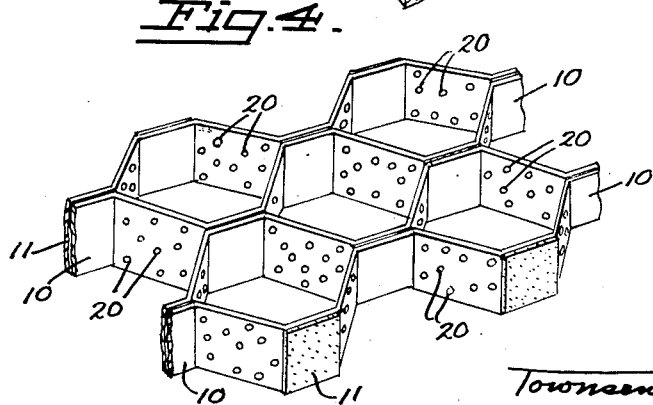
INVENTORS
KENNETH M. HOLLAND
JOHN P. SCHAFER
BY ROBERT C. SPOTT
Townsend, Townsend and Hoppe
ATTORNEYS

United States Patent Office 2,828,235
Patented Mar. 25, 1958

2,828,235

GLASS FACED HONEYCOMB PANEL AND METHOD OF MAKING SAME

Kenneth M. Holland, El Cerrito, John P. Schafer, Danville, and Robert C. Spott, Orinda, Calif., assignors to California Reinforced Plastics Company, Oakland, Calif., a corporation of California, now by change of name to Hexcel Products Inc.

Application October 12, 1954, Serial No. 461,806

5 Claims. (Cl. 154—118)

This invention relates to a new and improved structural light transmissive sandwich structure and method of making same.

The particular embodiment of the invention illustrated in the drawings and to be described hereinafter in greater detail comprises a lightweight metal foil honeycomb corestock sandwiched between two sections of sheet glass and permanently adhered thereto by a continuous film of adhesive applied over the inner faces of the sheet glass sections.

Generally speaking, in the building industry, structures incorporating sheet glass as a structural or load bearing component have not been considered practical. On the contrary, sheet glass has been most widely, although perhaps not exclusively, used in nonstructural applications such as light transmissive closures over window, door and wall openings.

It is a principal object of the present invention to provide a glass faced sandwich structure which possesses a combination of property characteristics not found in any single other type of glass structure of which we have knowledge. More specifically, it is a primary aim of the invention to provide a glass faced sandwich unit which combines the qualities of possessing very substantial structural strength, which provides a high degree of light transparency, which is substantially fire resistant, which provides a substantially shatter-proof glass faced structure, which has a high degree of thermal-endurance, and which is also a unit having an extremely pleasing appearance and which readily lends itself to a variety of decorative adaptations and uses.

Numerous other objects and advantages of the present invention will become apparent upon reading the following specification and referring to the accompanying drawings in which similar characters of reference represent corresponding parts in each of the several views.

In the drawings:

Fig. 1 is an enlarged fragmentary perspective view of a sheet of aluminum foil corestock to which the sheet glass sections are adhered.

Fig. 2 is a perspective view of a glass section showing schematically how one surface thereof may be coated with a continuous film of liquid adhesive.

Fig. 3 is a fragmentary perspective view of a finished panel unit embodying the invention with portions of the glass broken away.

Fig. 4 is a perspective view of a second type of aluminum foil corestock which may be employed in the manufacture of panels embodying the invention.

Referring now more particularly to the drawings, it is believed the nature of a panel unit embodying the invention can be most readily understood by having reference to a preferred method of manufacturing said unit.

The corestock used in the manufacture of the panel comprises an expanded section or sheet 9 of lightweight metal foil honeycomb such as, for example, aluminum foil honeycomb. Fig. 1 discloses such a structure as comprising a plurality of substantially sinusoidally curved or corrugated strips or webs 10 of aluminum foil extending in a substantially common direction. The strips 10 are bonded together node-to-node by adhesive 11 such as, for example, a suitable thermosetting synthetic resin. The method of manufacturing the aluminum foil corestock does not in and of itself comprise a part of the present invention and such material per se is well known in the art.

In fabricating panels of the present type, a uniform coating of suitable adhesive 12 is applied to one face surface of each of the two sheet glass sections 13 which are to be adhered to the opposite face surfaces of the aluminum foil corestock. Fig. 2 discloses a section of glass 13 on the upper surface of which has been poured or flowed a uniform coating of suitable liquid adhesive 12. Preferably, before applying the adhesive to the glass sections the latter are first thoroughly cleaned to remove all grit, dust, dirt and grease deposits from the glass material so as to provide an adequate bonding surface to which the adhesive will firmly adhere.

Further, it is preferable to heat the glass sections to an elevated temperature such as from 150° F. to 220° F. to evaporate moisture condensed on the surfaces prior to applying the film of adhesive to the glass sections. We have found that by preheating the glass sections in this manner and maintaining them at all times at elevated temperatures during application of the adhesive thereto that the completed glass faced panels will not delaminate due to moisture condensation on the interior glass surfaces. Preheating of the glass also facilitates application of the adhesive in a uniform flow over the glass surfaces. In this connection, the heated glass decreases the viscosity of the adhesive and permits it to be brushed or otherwise flowed on to the glass more readily and in a more uniform coating.

To produce a glass faced sandwich panel which combines all of the qualities earlier enumerated, the particular adhesive employed in its fabrication should be selected from a class of adhesive characterized (1) as having good specific adhesion to both glass and aluminum foil, (2) as being substantially optically clear and light stable, (3) as being capable of wetting the glass and aluminum foil to cause marked filleting at areas of contact between the aluminum honeycomb and glass sections, and (4) as being capable of curing to sufficient hardness for handling at room or only slightly elevated temperatures. In cases where it is desired to provide tinted or colored glass sandwich panels, it is convenient and most economical to mix the coloring pigment with the adhesive prior to its application to the glass section. In such cases, the adhesive selected must also, of course, be chemically compatible with whatever pigment is mixed therewith.

One particularly suitable type of adhesive possessing the above characteristics comprises an epoxy type resin which is commercially produced by the Bakelite Company under the trade name and designation of "Bakelite C-8 Resin BR 18795." The resin is used with a catalyst or hardener such as, for example, 37.5% by weight of "Hardener BRR 18,803" also sold commercially by the Bakelite Company. This adhesive is a thermosetting multiple stage type liquid synthetic resin which possesses good qualities of adhesion to both aluminum and glass surfaces. Moreover, this resin is relatively viscous at room temperature which is desirable because after the coated glass sections are applied to the corestock, the adhesive will not flow or run down the cell walls of the core but will remain in its filleted condition. Another advantage in using an epoxy resin of the character mentioned above is that it is liquid by its nature and does not contain any substantial amount of volatile solvents for which provision for escape must be made from the interior closed cells of the corestock. However, in the event it is desired to vent gases generated in the honeycomb cells during the curing cycle of the adhesive, a permeable corestock of a type shown in Fig. 4 may be employed. This latter type of core material of aluminum foil core may be considered identical in all respects to the type of corestock indicated in Fig. 1 except that one or more communicating apertures or openings 20 are provided through each cell wall whereby air communication is afforded between the interior cells and atmosphere for venting of volatile solvents generated during the curing or drying cycle of the adhesive. Technical details and data relating to the above identified Bakelite resin and hardener appear in a publication entitled "Bakelite C-8 Epoxy Resins, Techanical Bulletin No. 2, May 1954."

In addition to the Bakelite Company commercial resin above named, we have found that another commercially available epoxy resin manufactured by the Shell Chemical Company, having offices in San Francisco, California, and sold under the trade name and designation of "Epon 828" may also be used with good results. Technical details and data relating to Epon 828 appear in the publication entitled "Technical Bulletin SC: 52-14, Shell Chemical Corporation, dated March 1952, second printing May 1953." Moreover, it is contemplated that good results may be obtained using other types of organic and inorganic adhesives, including, for example, silicate and/or silicone adhesives.

The following procedure has been found satisfactory in fabricating the glass sections and the corestock to provide a completed panel unit: One adhesively coated and preheated glass section is placed on a flat or level table surface adhesive side up. The honeycomb core material is superposed on the adhesive face, and the adhesive coating is then cured to at least a sufficient degree of hardness whereby it can be readily handled without causing delamination between the corestock and the glass section. During the curing cycle, the galss section and corestock are preferably maintained under laminating pressures of from 2 to 5 p. s. i. to insure an intimate contact and adhesive bond between the core and glass. In utilizing the commercial Bakelite resin above identified, sufficient cure for handling at room temperature will result within 36 to 48 hours. The curing time can be shortened somewhat by using slightly elevated temperatures, such as from 90° to 110° F. The purpose and desirability of curing the adhesive at room temperatures or at only slightly elevated temperatures is that the commercial adhesives of the type above mentioned have a substantially greater coefficient of heat expansion than glass. Accordingly, if the adhesive is cured under relatively high temperatures, the latter will tend to contract to a much greater degree than the glass upon cooling to room temperature which phenomena will cause either delamination between the adhesive and the glass or, alternatively, will result in introducing stresses within the cured adhesive at non-elevated temperatures.

After one glass section has been adhered and cured to one face surface of the corestock, the second glass section (which has been previously cleaned, preheated and adhesively coated) is applied to the opposite face of the corestock in substantially the same manner as above described. More specifically, the coated glass section is laid on a flat table surface with its adhesive face facing upwardly. The corestock with the first glass section already applied to it can then be superposed on the wet adhesive face of the second section and the adhesive cured at room temperature to a condition for handling under pressures of 2 to 5 p. s. i.

After both glass sections have been applied and initially cured to the opposite faces of the corestock, the entire unit may be subjected to a post curing cycle in which the panel may be placed in an oven of approximately 250° F. for about two hours to insure complete cure or polymerization of the adhesive to its final thermoset condition.

Fig. 3 discloses how the adhesive, due to its ability to thoroughly wet the aluminum surfaces and because of its surface tension, will flow into contact with the cell edges of the corestock and form fillets 14 between the cell edges and the adhesive coated glass surface. The fillets insure a film and secure bond between the glass sections and the core material and also add to the pleasing appearance of the same.

From the foregoing, it is seen that a panel of the present type comprises a relatively lightweight metal foil corestock to the opposite sides of which is adhered two sections of flat glass by means of a continuous film or coating of adhesive. As heretofore indicated, panels constructed according to the invention combine qualities and property characteristics which are not found in any other single type of panel construction of which we have knowledge. For example, panels embodying the present invention have substantial structural strength. In this regard, actual tests on a 2 inch x 3 inch x .500 inch thick panel (using conventional flat window glass sections each .0938 inch thick) and tested in edgewise compression indicated that the subject panel was capable of supporting in excess of 10,000 pounds p. s. i. By comparison, published data on standard glass building blocks indicates the latter have an average compressive strength of between 400 to 600 p. s. i.

A panel constructed according to the invention as above described (utilizing clear flat glass) also exhibits highly desirable qualities of light transmission and light diffusion. In this latter connection, if an object is positioned in close proximity to one face of the panel, it may be distinctly seen and identified from the opposite side. However, if an object is moved several inches or more away from the panel, it appears from the other side as a blurred or shadowy image only. Furthermore, the cellular corestock disposed between the glass sections function as light baffles which in many installations and applications prevent direct transmission of sun or light rays through the panel.

Another desirable feature and property characteristic of the present panel construction is that the glass faces are rendered substantially shatter-proof by virtue of the adhesive film uniformly applied throughout their interior faces. Thus, should either face of the panel be subjected to a sudden shock or impact, any breaking of the glass will occur by cracking, usually in a cobweb pattern, without shattering or splintering.

Experiments and tests have also demonstrated that panels constructed according to the invention display a very substantial degree of thermal-endurance. This factor was demonstrated by several tests. One such test consisted of immersing a specimen panel in water at approximately 68° Fahrenheit and maintained therein until temperature equilibrium was reached. Thereupon the panel was plunged into boiling water at 200° Fahrenheit with the result that no cracking or other failure of either the glass or corestock was observed. In another test, one face of the panel was heated by hot air to 300° Fahrenheit and the opposite face was simultaneously air cooled. No cracking or other failure to either face was observed.

In addition to the aforementioned property characteristics, panels embodying the invention are also extremely attractive in appearance and lend themselves to numerous decorative applications. In this connection, the metal honeycomb corestock shows through the transparent glass faces in an overall honeycomb pattern. Moreover, the coatings of adhesive which bond the glass faces to the corestock may be tinted with any suitably colored pigment compatible with the chemistry of the particular adhesive employed in order to create different decorative effects. To obtain still other desired decorative effects, colored or tinted glass sheets can be employed in lieu of a more conventional uncolored glass, and frosted or etched glass can also be utilized in lieu of more conventional clear window glass.

Although the present invention has been described by way of illustration and example for purposes of clarity of understanding, it is understood that certain changes in modification may be made within the spirit of the invention as limited only by the scope of the claims appended hereto.

We claim:

1. A structural panel comprising: a corestock comprising a section of expanded metal foil honeycomb sandwiched between first and second sections of flat glass; a coating of cementitious material applied throughout the interior surface of each glass section intimately adhering said glass sections to opposite face surfaces of said honeycomb core; said section of corestock and said first and second sections of flat glass being coextensive in area and laminated together in coplanar relationship.

2. A light transmissive structural panel comprising: a corestock comprising a section of aluminum foil honeycomb having oppositely disposed parallel face surfaces defined by its open-cell edges; first and second sections of flat glass applied to opposite face surfaces of said corestock; an adhesive film coated over the interior surface of each flat glass section intimately adhering said glass surface to an adjacent face surface of the corestock; said adhesive being substantially optically clear, light stable, and thermoset; said section of corestock and said first and second sections of flat glass being coextensive in area and laminated together in coplanar relationship.

3. A method of making a light transmissive panel structure of a type comprising a metal foil honeycomb core to opposite face surfaces of which are adhered sections of flat glass, the steps comprising: providing a corestock section of expanded metal foil honeycomb having oppositely disposed face surfaces and also providing two sections of flat sheet glass each approximately coextensive in area to a face surface area of the corestock; cleaning the surfaces of said glass sections; heating one glass section above room temperature to evaporate moisture condensation thereon; while maintaining said glass section at elevated temperature applying a film of liquid adhesive over one flat surface of said section; superimposing the wet adhesive surface of said section to one face surface of the corestock; and while maintaining said section and said corestock in intimate contact with one another curing said adhesive to a relatively hard-set condition; then heating said second glass section to elevated temperature to evaporate moisture and applying a film of adhesive throughout the area of the second glass section; then superposing the wet adhesive side of said second glass section to the second face surface of the corestock, and while maintaining them in intimate contact, curing said adhesive to a relatively hard set condition.

4. The method of claim 3 and wherein the adhesive films are cured to relatively hard-set condition within the temperature range of from about room temperature to about 110° F. to minimize introducing stresses within the cured adhesive at room temperature due to different coefficients of heat expansion between said adhesive and said glass sections.

5. A method of making a light transmissive panel structure of a type comprising a metal foil honeycomb core to opposite face surfaces of which are adhered sections of flat glass, the steps comprising: providing a corestock section of expanded metal foil honeycomb having oppositely disposed face surfaces and also providing two sections of flat sheet glass each approximately coextensive in area to a face surface area of the corestock; cleaning the surfaces of said glass sections; heating each glass section above room temperature to evaporate moisture condensation thereon; and while maintaining said glass sections at elevated temperature applying a film of adhesive over one flat surface of each; and superimposing in intimate contact the wet adhesive surface of each said section to a respective face surface of said corestock.

References Cited in the file of this patent

UNITED STATES PATENTS

| | | |
|---|---|---|
| 2,196,109 | Eastus | Apr. 2, 1940 |
| 2,382,566 | Heckman | Aug. 14, 1945 |
| 2,545,805 | Callender | Mar. 20, 1951 |
| 2,545,907 | Watkins | Mar. 20, 1951 |
| 2,609,068 | Pajak | Sept. 2, 1952 |
| 2,644,777 | Havens | July 7, 1953 |
| 2,695,430 | Wakefield | Nov. 30, 1953 |
| 2,690,073 | McLaughlin | Sept. 28, 1954 |

OTHER REFERENCES

Br. Plastics, "Plastics and the honeycomb structure," G. May, vol. 25, June 1952, pages 201–205.